United States Patent [19]

Goossens et al.

[11] 4,242,383

[45] Dec. 30, 1980

[54] METHOD OF PROVIDING A POLYCARBONATE ARTICLE WITH A UNIFORM AND DURABLE ORGANOPOLYSILOXANE COATING

[75] Inventors: John C. Goossens, Mt. Vernon, Ind.; Daniel R. Olson, Clifton Park, N.Y.

[73] Assignee: General Electric Company, Pittsfield, Mass.

[21] Appl. No.: 31,130

[22] Filed: Apr. 18, 1979

[51] Int. Cl.$^3$ .......................... A23F 3/00; B32B 27/36
[52] U.S. Cl. ................................ 427/387; 427/412.1; 428/412; 428/447
[58] Field of Search ................ 428/412, 447; 427/387, 427/412.1

[56] References Cited

U.S. PATENT DOCUMENTS

| | | | |
|---|---|---|---|
| 3,582,398 | 6/1971 | Ringles | 428/412 |
| 3,650,808 | 3/1972 | Gagnon | 427/387 |
| 3,707,397 | 12/1972 | Gagnon | 428/412 |
| 3,843,390 | 10/1974 | Hudson et al. | 428/412 |
| 3,978,178 | 8/1976 | Oshima et al. | 264/25 |
| 3,986,997 | 10/1976 | Clark | 428/412 |
| 4,024,306 | 5/1977 | Takamizawa | 428/412 |
| 4,027,073 | 5/1977 | Clark | 428/412 |
| 4,040,882 | 8/1977 | LeGrand et al. | 428/412 |
| 4,041,120 | 8/1977 | Oshima et al. | 428/412 |
| 4,045,602 | 8/1977 | Sommer et al. | 264/171 |
| 4,135,007 | 1/1979 | Lorenz et al. | 428/412 |
| 4,156,046 | 5/1979 | Lien et al. | 427/387 |
| 4,188,451 | 2/1980 | Humphrey, Jr. | 427/387 |

*Primary Examiner*—George F. Lesmes
*Assistant Examiner*—E. Rollins Buffalow
*Attorney, Agent, or Firm*—William F. Mufatti

[57] ABSTRACT

A process for providing a protective coating on a polycarbonate substrate comprising (i) applying onto said polycarbonate substrate a priming emulsion composition containing (a) a thermosettable acrylic polymer, (b) an ultraviolet light absorber selected from the benzylidene malonates and cyanoacrylates, (c) water, and (d) a hydroxy ether or a lower alkanol; (ii) curing the thermosettable acrylic polymer thereby forming a primer layer containing a thermoset acrylic and an ultraviolet light screener on said substrate; (iii) applying a top coat composition containing a further curable organopolysiloxane; and (iv) curing said further curable organopolysiloxane thereby obtaining a thermoset organopolysiloxane top coat.

28 Claims, No Drawings

METHOD OF PROVIDING A POLYCARBONATE ARTICLE WITH A UNIFORM AND DURABLE ORGANOPOLYSILOXANE COATING

This invention relates to a method of applying a protective coating to a polycarbonate substrate; more particularly, it relates to a method of providing a uniform and durably adhered coating which protects the underlying polycarbonate substrate against the adverse effects of ultraviolet light and against scratching, marring, abrasion and attack by chemical solvents. The method includes (i) applying onto the polycarbonate substrate a primer emulsion composition containing (a) a thermosettable acrylic polymer, (b) at least one ultraviolet light absorbing compound selected from the benzylidene malonates and cyanoacrylates, (c) water, and (d) a hydroxy ether or an alkanol containing from 1 to 4 carbon atoms; (ii) evaporating off the water and hydroxy ether or alkanol from said primer emulsion composition thus leaving a thin layer containing said thermosettable acrylic and said ultraviolet light absorbing compound; (iii) applying heat to said thin layer to cure said thermosettable acrylic thereby forming a cured primer layer containing a thermoset acrylic and said ultraviolet absorbing compound; (iv) coating the primed substrate with a top coat composition containing a further curable organopolysiloxane; (v) evaporating off any solvent from said top coat composition; and (vi) curing said further curable organopolysiloxane thereby forming a top coat containing a thermoset organopolysiloxane.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion, scratch and mar resistance is relatively low and they are adversely affected by prolonged exposure to ultraviolet light.

In order to overcome this relatively low scratch and mar resistance, various coatings have been applied to these polycarbonate resins. U.S. Pat. Nos. 3,451,838, 3,986,997 and 4,027,073 disclose organopolysiloxane coating compositions and techniques for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. In order to improve the adhesion of the organopolysiloxane coatings to the substrate, the prior art, as for example U.S. Pat. No. 3,707,397, has suggested priming the substrates prior to application of the organopolysiloxane coatings thereon.

The difficulty in applying an adhesion promoting primer to the polycarbonate resides in the polycarbonate resins' susceptibility to attack and degradation by some of the more active chemical materials, which materials may be present either in the primer itself or in the delivery system of the primer. Thus, the primer must not only act as an adhesion promoter between the organopolysiloxane and the polycarbonate, but must also be compatible with both the polycarbonate and the organopolysiloxane. Furthermore, not only must the primer itself be compatible with both the polycarbonate and the organopolysiloxane coating, but the delivery system by which the primer is applied onto the polycarbonate must not deleteriously affect the polycarbonate. Since the prior art generally teaches the delivery of the primer as a solution of the primer material dissolved in an organic solvent, and since many of these organic solvents aggressively attack the polycarbonate, such a means of applying a primer to a polycarbonate is not very effective or practical in producing mar-resistant coated polycarbonate articles.

There thus exists a need for polycarbonate articles having uniformly, tenaciously and durably adhered scratch, mar, abrasion, ultraviolet light and chemical solvent resistant coatings thereon and for a method of applying such coatings, and it is a primary object of the present invention to provide such articles and an effective method for producing these articles.

DESCRIPTION OF THE INVENTION

This invention relates to a method of coating polycarbonate articles with an organopolysiloxane coating by first priming the polycarbonate substrate with a primer emulsion composition containing a thermosettable acrylic polymer, an ultraviolet light absorbing compound, water, and a hydroxy ether or alkanol, and thereafter depositing an organopolysiloxane top coating thereon.

In the practice of the present invention, prior to the application of the organopolysiloxane coating onto the polycarbonate surface, the surface is first primed by the application thereon of a primer composition comprised of an emulsion containing water, a hydroxy ether or alkanol, at least one ultraviolet light absorbing compound and a thermosettable acrylic polymer. A substantial portion of the water and hydroxy ether or alkanol component of the primer composition is then evaporated off and the resulting solid layer comprised of the thermosettable acrylic polymer and at least one ultraviolet light absorber is thermally cured to provide a thermoset acrylic primer layer containing an ultraviolet light absorber. The primed polycarbonate is then coated with a top coat composition containing a solvent soluble further curable organopolysiloxane, the volatile solvents are driven off from said top coat composition leaving a solid layer comprised of further curable organopolysiloxane, and the further curable organopolysiloxane is thermally cured thereby providing an adherent and durable organopolysiloxane top coat on the primed polycarbonate.

The carbonate polymer, preferably an aromatic carbonate polymer, of the instant invention has recurring units of the formula

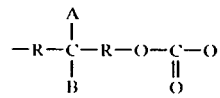

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining —C— atom form a cycloalkane radical, the total number of carbon atoms in A and B being up to 12.

The aromatic carbonate polymer of this invention may be prepared by methods well known in the art and as described in U.S. Pat. Nos. 3,161,615; 3,220,973; 3,312,659; 3,312,660; 3,313,777; 3,666,614; and 3,989,672, among others, all of which are incorporated herein by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

The preferred polycarbonate resins may be derived from the reaction of bisphenol-A and phosgene. These polycarbonates have from 10–400 recurring units of the formula:

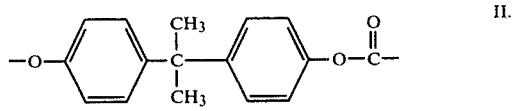

The polycarbonate should have an intrinsic viscosity between 0.3 and 1.0, preferably from 0.40 to 0.65 as measured at 25° C. in methylene chloride.

The primer emulsion composition of the present invention generally contains, in percent by weight, from about 1 to about 10 percent thermosettable acrylic solids, from about 1 to about 10 percent of at least one ultraviolet light absorbing compound selected from the benzylidene malonates and cyanoacrylates, from about 20 to about 40 percent of a hydroxy ether or alkanol containing from 1 to 4 carbon atoms, and from about 40 to about 78 percent of water. The thermosettable acrylic solids are provided in the form of a thermosettable acrylic polymer emulsion concentrate. This thermosettable acrylic polymer emulsion concentrate is comprised of a thermosettable acrylic polymer dispersed in water. The polymer is generally in the form of discrete spherical particles (approximately 0.1 micron in diameter) dispersed in water. Since the polymer particles are separate from the continuous aqueous phase, the viscosity of the dispersion or emulsion is relatively independent of the polymer's molecular weight. Consequently, the emulsion concentrate and, therefore, the primer emulsion composition can contain polymers of high molecular weight and yet have a relatively low viscosity.

The thermosettable acrylic polymers present in the emulsion are well known in the art. Exemplary thermosettable acrylics which may be employed in the practice of this invention are set forth, for example, in *Encyclopedia of Polymer Science and Technology*, Vol. 1, Interscience Publishers, John Wiley & Sons, Inc., copyright 1964, at p. 273 et seq., and in *Chemistry of Organic Film Formers*, by D. H. Solomon, John Wiley & Sons, Inc., 1967, at p. 251 et seq., and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups inter-reaction between carboxyl and isocyanate groups; reactions between hydroxyl, for example, polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less and, typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_2$) alkyl acrylic ester or mixtures thereof, e.g., methyl acrylate, ethyl acrylate, methyl methacrylate, ethyl methacrylate, or mixtures thereof, in an amount ranging between about 75 parts to about 99 parts and, more typically, between about 80 parts to about 97 parts.

The thermosetting acrylic polymer emulsion concentrates generally useful in the practice of the instant invention are generally commercially available and are sold, for example, by Rohm & Haas, Philadelphia, PA, as their Rhoplex. Generally, these emulsion concentrates contain from about 40 to about 55% solids. However, in formulating the primer emulsion composition, it has been found desirable that the primer emulsion compositions contain from about 1 to about 10% by weight acrylic solids. Thus, it is generally necessary to dilute these commercially available emulsion concentrates by the addition of additional water thereto. These primer emulsion compositions may additionally contain curing catalysts for the acrylic polymers. If present, the catalyst is present in from about 0.05 to about 2 weight % based on the weight of the acrylic solids. Examples of these catalysts include toluene sulfonic acid, citric acid, phosphorus acid, etc.

A second component of the primer emulsion compositions is a hydroxy ether or alkanol containing from 1 to 4 carbon atoms. The hydroxy ethers are represented by the general formula $$R^1-O-R^2-OH \qquad \text{III.}$$

wherein $R^1$ is an alkyl or an alkoxy alkyl radical containing from 1 to about 6 carbon atoms and $R^2$ is an alkylene radical containing from 1 to about 6 carbon atoms, provided that the sum of the carbon atoms present in $R^1$ and $R^2$ is from 3 to about 10. The alkanols containing from 1 to 4 carbon atoms include methanol, ethanol, propanol, isopropanol, butanol, tert-butanol, and the like. The emulsion composition is critical to the satisfactory performance of the primer emulsion composition in forming an effective primer layer. If no hydroxy ether or alkanol is present, or if an amount of hydroxy ether or alkanol less than about 20 weight % is present, the primer emulsion composition does not flow evenly over the polycarbonate substrate, i.e., there is uneven distribution of the primer emulsion composition over the substrate with excessive concentrations of the primer emulsion composition in certain areas and the total absence of the primer emulsion composition in other areas. This results in an unevenly distributed and non-uniform primer layer being formed which, in turn, results in inferior adhesion of the silicone top coat and in a streaked appearance of the final product. If too much of the hydroxy ether or alkanol is present, i.e., amounts generally greater than about 40 weight percent, coagulation and precipitation of the acrylic solids will generally occur in time varying from minutes to several days. Thus, the emulsion composition contains an effective amount of hydroxy ether or alkanol, i.e., an amount sufficient to allow even flow and distribution of the emulsion composition on the substrate but insufficient to cause precipitation of the acrylic solids and coagulation of the emulsion. Generally, this effective amount ranges from about 20 to about 40 weight percent.

The concentration of the acrylic polymer solids in the primer emulsion composition is also generally quite important. Organopolysiloxane top coats applied onto thermoset acrylic primers derived from primer emulsion compositions containing less than about 1 or more than about 10 weight percent of thermosettable acrylic polymer generally tend to have a marked decrease in durability of adhesion, especially after exposure to weathering, and abrasion resistance relative to organopolysiloxane top coats applied onto thermoset acrylic primers derived from primer emulsion compositions containing from about 1 to about 10 weight percent of a thermosettable acrylic polymer. Primer emulsion compositions containing from about 2 to about 6 weight percent of thermosettable acrylic polymer are preferred.

The third component of the primer emulsion compositions is an ultraviolet light absorbing or screening compound. In order to be effectively employed in primer emulsion compositions, the ultraviolet light absorbing compounds must (i) be sufficiently soluble in the primer emulsion compositions to provide a primer emulsion composition containing an amount of said ultraviolet light absorbing compound sufficient to provide a primer layer containing an amount of ultraviolet light absorbing compound effective to effectively protect the polycarbonate substrate from ultraviolet light, i.e., the primer emulsion compositions generally should contain from about 1 to about 10 weight percent of said light absorbing compound; (ii) be compatible with the primer emulsion composition, i.e., they must not affect the stability of the emulsion; and (iii) not adversely affect the adhesion promoting properties of the primer layer. Thus, while many compounds are excellent ultraviolet light screeners, they cannot be used in the instant primer emulsion compositions because they are not sufficiently soluble in the primer emulsion compositions. Examples of these types of compounds include the substituted benzotriazoles and certain substituted benzophenones such as 2,2'-dihdyroxy-4,4'-dimethoxybenzophenone. Other compounds which are excellent ultraviolet light screeners and are sufficiently soluble in the instant primer emulsion systems, e.g., they affect the stability of the emulsion and cause the acrylic solids to coagulate. Examples of these types of compounds include certain substituted benzophenones such as 2,2',4,4'-tetrahydroxybenzophenone and 2-hydroxy-4-methoxy-5-sulfobenzophenone.

It has been found that two groups of ultraviolet light absorbing compounds not only are soluble in and compatible with the primer emulsion composition, but also, surprisingly and unexpectedly, increase the durability of an organopolysiloxane top coat deposited on a polycarbonate substrate primed with a primer layer containing the afore-described thermoset acrylic and said ultraviolet light absorbers.

These ultraviolet light absorbing compounds are selected from the class consisting of benzylidene malonates and alphacyanoacrylates.

The benzylidene malonates are compounds well known in the art and are represented by the general formula

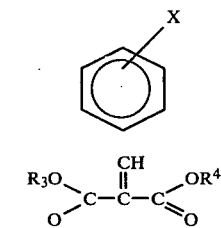

IV.

wherein X is selected from hydrogen, OH; halogen radicals; alkyl radicals, preferably alkyl radicals containing from 1 to about 10 carbon atoms; and, alkoxy radicals, preferably alkoxy radicals containing from 1 to about 10 carbon atoms; and, $R^3$ $R^4$ are independently selected from alkyl radicals, preferably alkyl radicals containing from 1 to about 10 carbon atoms, substituted alkyl radicals, preferably those containing from 1 to about 10 carbon atoms and hydroxyl or halogen substituents, aryl radicals, preferably phenyl radicals, alkaryl radicals, preferably alkaryl radicals containing from 7 to about 12 carbon atoms, aralkyl radicals, preferably aralkyl radicals containing from 7 to 12 carbon atoms, and substituted aryl radicals, preferably phenyl radicals containing hydroxyl or halogen substituents.

Examples of alkyl radicals containing from 1 to about 10 carbon atoms include methyl, ethyl, n-propyl, isopropyl, n-butyl, isobutyl, sec-butyl, octyl, and the like. Examples of substituted alkyl radicals containing from 1 to about 10 carbon atoms and hydroxyl or halogen substituents include chloromethyl, 3-bromopropyl, 2-hydroxypropyl and the like.

Examples of alkoxy radicals containing from 1 to about 10 carbon atoms include methoxy, ethoxy, propoxy, isobutoxy, n-butoxy, and the like.

Examples of alkaryl radicals containing from 7 to about 12 carbon atoms include tolyl, 2,3-xylyl, 2,4-xylyl, 2,5-xylyl, o-, m-, and p-cumenyl, and the like. The aralkyl radicals containing from 7 to about 12 carbon atoms include benzyl, phenylethyl, phenylpropyl, phenylbutyl, and the like.

Preferred benzylidene malonates represented by formula IV are those where X represents an alkoxy group containing from 1 to about 10 carbon atoms and $R^3$ and $R^4$ are independently selected from alkyl radicals containing from 1 to about 10 carbon atoms. Examples of these preferred compounds include diethyl paramethoxybenzylidene-malonate and dimethylparamethoxybenzylidene-malonate.

The alpha-cyanoacrylates useful in the practice of the present invention are also well known compounds and are represented by the general formula

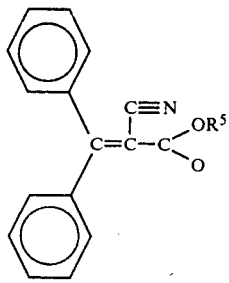

V.

wherein $R^5$ represents the same radicals as $R^3$ above.

Preferred cyanoacrylates are those wherein $R^5$ is an alkyl radical containing from 1 to about 10 carbon atoms. Examples of these preferred compounds include octyl 2-cyano-3,3-diphenyl-acrylate and ethyl 2-cyano-3,3-diphenylacrylate.

The primer emulsion compositions of the present invention can contain only one of these ultraviolet light absorbing compounds or a mixture of two or more, but preferably two, of these compounds. Thus, for example, the primer emulsion compositions can contain two different compounds represented by formula IV, two different compounds represented by formula V, or one compounded represented by formula IV and one compound represented by formula V.

In the method of the present invention, a thin layer of the primer composition is applied onto the polycarbonate substrate by any of the well known methods such as spraying, dipping, roll-coating and the like. Generally, the primer composition is applied in an amount sufficient to provide a cured primer film of from about 0.01 to about 0.1 mil thick, preferably from about 0.02 to about 0.08 mil thick. A major portion of the water and hydroxy ether or alkanol is then evaporated off, as by air drying or mild heating, to leave an even and uniform solid layer comprised of thermosettable acrylic and said ultraviolet light absorbing compound. The thermosettable acrylic is then cured by heating the solid layer at a temperature of from about 90° to about 130° C., thereby forming a primer layer containing, in percent by weight, from about 10% to about 90%, preferably from about 40% to about 80%, and more preferably from about 50% to about 70% of a thermoset acrylic and from about 10% to about 90%, preferably from about 20% to about 60%, and more preferably from about 30% to about 50% of at least one ultraviolet light stabilizing compound.

After the polycarbonate article has been primed by the application thereon of the primer composition and the evaporation of the solvent from the primer composition, a top coat composition containing a further-curable organopolysiloxane is applied onto the primed polycarbonate substrate.

The further-curable organopolysiloxane is generally partial hydrolysis and condensation product of at least one compound represented by the general formula $$R^6{}_nSiZ_{(4-n)} \qquad \text{VI}$$

wherein $R^6$ represents a monovalent hydrocarbon radical and a halogenated monovalent hydrocarbon radical, Z represents a hydrolyzable group, and n may vary between 0 and 3 inclusive, preferably between 0 to 2 inclusive.

More specifically, Z is independently a member such as halogen, alkoxy, acyloxy and aryloxy.

Preferably, $R^6$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy, and the like, an acyloxy radical containing from 2 to about 9 carbon atoms, such as acetoxy, propionoxy, butanoxy, pentanoxy, hexanoxy and the like, and a phenoxy radical; and n varies from 0 to 2.

Preferred compounds of formula IV are silanes of the formula $$R^7{}_aSi(OR^8)_{4-a} \qquad \text{VII.}$$

and silanes of the formula $$R^9{}_bSi(OCOR^{10})_{4-b} \qquad \text{VIII.}$$

wherein $R^7$ and $R^9$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^8$ and $R^{10}$ represent monovalent hydrocarbon radicals and halogenated monovalent radicals such as alkyl radicals and phenyl radicals, but are preferably alkyl radicals of 1 to 8 carbon atoms; a varies between 0 to 3 inclusive, preferably between 0 to 2 inclusive; and b varies between 0 to 3 inclusive, preferably 0 to 2 inclusive.

Upon hydrolysis, the compounds of formula IV ae more specifically those of formulae VII and VIII are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl groups. This partial condensate can be characterized as a further-curable, i.e., further condensable, siloxanol polymer. During curing of the further-curable organopolysiloxane, which has been deposited on the primed polycarbonate substrate, the residual hydroxyls condense to give a thermoset organopolysiloxane.

The further-curable organopolysiloxane may be formulated into the top coat composition as a solution of the siloxanol polymer in water and alcohol by-product, as a concentrated solution of siloxanol in water and alcohol by-product by evaporating off a substantial quantity of the alcohol by-product and water, or it may be formulated into the top coat composition as a solid partially pre-cured product by evaporating off a substantial amount of alcohol by-product and water and then partially precuring and solidifying the concentrated product.

Examples of silicone top coats useful in the practice of the instant invention are the foregoing alkoxy and aryloxy functional silanes represented by formula VII and acyloxy functional silanes represented by formula VIII. Such alkoxy functional, aryloxy functional and acyloxy functional silanes are well known materials to silicone manufacturers and are easily obtainable. With respect to the acyloxy functional silanes, these materials are generally applied without any solvent since it has been found that the use of solvents in application of such top coat at time seriously degrades the applied silicone top coat. Preferably, the silanes of formula VIII, that is the acyloxy functional silanes, are applied at 100% solids or from 20 to 100% solids. In the case of the acyloxy silanes where the solids are less than 100%, the silane is simply the water hydrolsis and partial condensation product of the foregoing acyloxy functional silanes of formula VIII. The alkoxy and aryloxy functional silanes of formula VIII are generally applied from a top coat composition containing solvents in a concentration of from about 20 to 95% by weight. Examples of solvents which may be used in the formulation of the top coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and, thereafter, the concentrated partial condensation product is precured by heating at a temperature below the gel point thereof and generally in the range of about 70° to 300° C. to produce the solvent-soluble, further-curable organopolysiloxane. This precured solvent-soluble, further-curable organopolysiloxane is then dissolved in a suitable solvent to form the top coat composition and the primed polycarbonate substrate is then coated with this top coat composition. The solvent is then evaporated and the residual further-curable organopolysiloxane is cured to a thermoset state to provide a uniformity and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure but the temperature should be below the glass transistion temperature of the polycarbonate. Of course, if the glass transistion temperature of the polycarbonate is exceeded, then the polycarbonate part may become deformed and lose its utility.

One particular further-curable organopolysiloxane that can be employed in the top coat composition of the instant invention is the partial hydrolysis and condensation product of an alkyltrialkoxy, preferably methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat on the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-soluble, further-curable organopolysiloxane is then dissolved to a desired concentration in a suitable solvent to form the top coat composition containing a further-curable organopolysiloxane. The top coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

Yet another further-curable organopolysiloxane which may be employed in the practice of the present invention is the partial hydrolysis and condensation product of methyltrimethoxysilane. This organopolysiloxane is prepared by hydrolyzing at or below room temperature methyltrimethoxysilane with water in the presence of a hydrolysis catalyst such as HCl to product a partial condensation product. This partial condensation product is then concentrated by removing a substantial amount of the alkanol by-product and some water. This concentrated product is then partially precured to provide a solid, solvent-soluble, further-curable organopolysiloxane.

These are not the only silicones that may be utilized in the top coats of the instant invention. Less preferred silicones which can be partially hydrolyzed and condensed or dissolved in a solvent are, for instance, silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl, and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic radical to silicon atom ratio of 1:1 to 1.9:1, may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain fillers such as, for example, glass, talc, and silica, preferably colloidal silica.

The top coat compositions containing the afore-described silicones are simply brushed, dipped, sprayed or flowed on top of the primer layer that is applied to the polycarbonate substrate. The solvent, or alcohol by-product and water, present in the top coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

The thickness of the top coat generally is dependent upon the method of application and upon the weight percent solids present in the further-curable organopolysiloxane top coat composition. In general, the higher the percent solids, and the longer the application time, the greater the thickness of the top coat. It is preferred that the cured top coat have a thickness of from about 0.1 to about 0.5 mils, more preferably from 0.15 to about 0.4 mils, and most preferably, from about 0.2 to about 0.25 mils.

Thus, the method of the instant invention comprises (i) applying onto a polycarbonate substrate a primer emulsion composition containing, in percent by weight, (a) from about 1 to about 10 percent of a thermosettable acrylic polymer, (b) from about 1 to about 10 percent of at least one ultraviolet light absorbing compound selected from the class consisting of benzylidene malonates and cyanoacrylates, (c) from about 20 to about 40 percent of a hydroxy ether or an alkanol containing from 1 to 4 carbon atoms, and (d) from about 40 to about 78 percent water; (ii) evaporating off a substantial portion of the water and hydroxy ether or alkanol from said primer emulsion composition thereby leaving a solid layer comprised of said thermosettable acrylic polymer and said ultraviolet light absorbing compound or compounds; (iii) applying heat to said thermosettable acrylic primer layer; (iv) applying a further-curable organopolysiloxane containing top coat composition onto said cured primer layer; (v) evaporating off a substantial portion of the volatile solvents present in the top coat composition, and (vi) curing the top coating by the application of heat thereto to form a thermoset organopolysiloxane.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates the attempted preparation of a primer emulsion composition employing 2-hydroxy-4-methoxy-5-sulfobenzophenone as the ulltraviolet light absorbing compound. Two grams of 2-hydroxy-4-methoxy-5-sulfobenzophenone are dissolved in 40 grams of butoxy ethanol. To this are added, with stirring, 50 grams of water. To this solution are added 8 grams of a commercially available thermosettable acrylic emulsion (46.5–47.5% acrylic solids dispersed in water). One such commercially available thermosettable acrylic emulsion is available from Rohm & Haas, Philadelphia, Pa., as their Rhoplex AC-658. A precipitate formed almost immediately upon addition of the thermosettable acrylic emulsion thereby rendering this composition unsuitable for use as a primer composition.

EXAMPLE 2

This example illustrates the attempted preparation of a primer emulsion composition employing 2,2',4,4'-tetrahydroxybenzophenone as the ultraviolet light absorbing compound. Two grams of 2,2',4,4'-tetrahydroxybenzophenone are dissolved in 40 grams of butoxy ethanol. To this are added, with stirring, 50 grams of water. To the resulting solution are added 8 grams of Rhoplex AC-658. A precipitate is eventually formed thus rendering this composition unsuitable for use as a primer composition.

EXAMPLE 3

This example illustrates the attempted preparation of a primer emulsion composition utilizing 2,2'-dihydroxy-4,4'-dimethoxybenzophenone as the ultraviolet light absorbing compound. One gram of 2,2'-dihydroxy-4,4'-dimethoxybenzophenone is dissolved in 40 grams of butoxy ethanol. Fifty grams of water are added to the resultant solution. After addition of the water, the mixture becomes turbid indicating that the 2,2'-dihydroxy-4,4'-dimethoxybenzophenone is being forced out of solution.

Examples 1 and 2 illustrate the afore-discussed destabilization of the primer emulsion compositions by certain ultraviolet light absorbing compounds while Example 3 illustrates the insufficient solubility of certain ultraviolet light absorbing compounds in the water/hydroxy ether system of the primer emulsion compositions.

EXAMPLE 4

This example illustrates the preparation of a primer emulsion composition which does not contain any ultraviolet light screener. Thirty-two grams of butoxy ethanol are blended with 59.5 grams of water and to this blend are added, with stirring, 8.5 grams of Rhoplex AC-658.

EXAMPLE 5

This example further illustrates the preparation of a primer emulsion composition of the present invention. Three grams of diethyl paramethoxybenzylidene malonate are dissolved in 32 grams of butoxy ethanol. To this solution are added 56.5 grams of water. To this resulting solution are added, with stirring, 8.5 grams of Rhoplex AC-658.

EXAMPLE 6

This example illustrates a primer emulsion composition containing an ultraviolet light absorbing compound falling outside the scope of the present invention. Three grams of resorcinol monobenzoate are dissolved in 32 grams of butoxy ethanol. To this solution are added, with stirring, 8.5 grams of Rhoplex AC-658.

Generally, a commercially available organopolysiloxane is utilized in the top coat composition. One such organopolysiloxane is the partial hydrolysis and condensation product of an alkyltrialkoxy silane, preferably a methyltrialkoxy silane such as methyltriethoxy and/or methyltrimethoxy silane.

EXAMPLE 7

Clear generally rigid 6"×8"×¼" polycarbonate panels, said polycarbonate being derived from a diphenol monomer such as bisphenol-A (2,2'-bis(4-hyroxyphenyl)propane), are flow coated with a primer emulsion composition prepared substantially in accordance with Example 4. The coated panels are air dried for ½ hour to evaporate off the water and butoxy ethanol and then baked at 120° C. for one hour. The primed panels are then flow coated with the further-curable organopolysiloxane top coat composition described above, are air dried for ½ hour, and are baked for one hour at 120° C. These primed, top coated polycarbonate panels are subjected to an abrasion test, ASTM Yellowness Index (YI) Test 1925, RS-sunlamp aging test, and humidity test and the results are set forth below in Table I.

The abrasion test is one wherein test panels having a ¼ inch diameter hole cut in the center are subjected to a Taber Abraser. The Taber Abraser is equipped with CS-10F wheels which are re-surfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardener Hazemeter. The sample is abraded for 300 cycles, cleaned with isopropanol, and the % Haze is remeasured at the same four places. The four differences in % Haze are calculated and averaged to give the Δ% Haze.

The RS-sunlamp aging test is used to ascertain the durability of adhesion of the organopolysiloxane top coat to the polycarbonate substrate. This test is one wherein the samples undergo severe exposure to ultraviolet radiation. In this test, the top coated samples are exposed to an RS-sunlamp and after exposure for a predetermined period of time are removed and subjected to a scribed adhesion test. The scribed adhesion test consists of using a multiple blade tool to cut parallel grooves about 2 mm apart through the coating into the substrate, rotating the sample 90° and repeating the cutting process thereby forming a grid pattern of 2 mm squares cut into the coating, and applying an adhesive tape over the cross-hatched area and quickly pulling said tape off. A sample fails the adhesion test if any of the squares in the grid are pulled off.

The humidity test is used to ascertain the durability of adhesion of the top coat to the polycarbonate substrate under conditions of high relative humidity. This test involves subjecting samples to a number of humidity oven cycles, and after each cycle, subjecting said samples to the afore-described adhesion test. One humidity over cycle consists of placing the sample into a cabinet maintained at 99% relative humidity and 80°–85° F., raising the temperature to 140° F., maintaining the temperature at 140° F. for 6 hours, and thereafter lowering the temperature to 80°–85° F., at which time one cycle is complete and the sample is removed and undergoes the adhesion test.

The water immersion test is used to ascertain the durability of adhesion of the top coat to the polycarbonate substrate under exposure to water. This test involves immersing coated samples in deionized water at 65° C. The samples are periodically removed and subjected to the scribed adhesion test.

EXAMPLE 8

Clear generally rigid 6"×8"×¼" polycarbonate panels are flow coated with a primer emulsion composition prepared substantially in accordance with Example 5. The coated panels are air dried for ½ hour to evaporate off a substantial amount of the water and butoxy ethanol and then baked at 120° C. for one hour. The primed panels are then flow coated with a further-curable organopolysiloxane top coat composition described above, are air dried for ½ hour, and are baked for one hour at 120° C. These primed, top coated polycarbonate panels are subjected to the afore-described abrasion test, Yellowness Index Test, RS-sunlamp aging test, humidity test, and water immersion test and the results are set forth below in Table I.

EXAMPLE 9

Clear generally rigid 6"×8"×¼" polycarbonate panels are flow coated with a primer emulsion composition prepared substantially in accordance with Example 6. The coated panels are air dried for ½ hour to evaporate off a substantial portion of the water and butoxy ethanol and then baked at 120° C. for one hour. The primed panels are then flow coated with a further-curable organopolysiloxane top coat composition described above, are air dried for ½ hour, and are baked for one hour at 120° C. These primed, top coated polycarbonate panels are subjected to the afore-described abrasion test, Yellowness Index Test, RS-sunlamp aging test, humidity test, and water immersion test and the results are set forth below in Table I.

TABLE I

| Example No. | % H/300 Cycles | Yellowness Index (YI) in RS-sunlamp Exposure | | No. of Hours of Exposure to RS-sunlamp at which sample fails adhesion test | No. of humidity oven cycles after which sample fails adhesion test | No. of Hours Immersion in water after which sample fails adhesion test |
| --- | --- | --- | --- | --- | --- | --- |
| | | Initial Yellowness Index | Days to Reach a Yellowness Index of 7 | | | |
| 7 | 3.2 | 1.1 | 8 | 1,200 | 10 | 24 |
| 8 | 2.9 | 1.3 | 25 | 1,500 hours | 42 | 56 |
| 9 | 3.6 | 1.4 | 18 | 815 hours | 10 | 18 |

As can be seen from Table I, the polycarbonate panels coated in accordance with the method of the instant invention, i.e., Example 8, not only are more resistant to yellowing than those panels containing a primer without any UV screener, i.e., Example 7, but the durability of adhesion of the organopolysiloxane top coat of these panels is much greater, under exposure to water, humidity and ultraviolet light, than that of the panels primed with a primer emulsion composition containing no ultraviolet light screener, i.e., Example 7, and of the panels primed with a primer emulsion composition containing an ultraviolet light screener other than the benzylidene malonates and cyanoacrylates of the present invention, i.e., Example 9.

Comparison of the test results for Example 9, wherein the primer emulsion composition contains resorcinol monobenzoate as the ultraviolet light screener, with the test results for Example 7, wherein the primer emulsion composition contains no ultraviolet light absorber, demonstrates that priming a polycarbonate panel with a primer emulsion composition containing an inappropriate ultraviolet light screener actually decreases the durability of adhesion of the top coat to the polycarbonate substrate relative to priming a polycarbonate panel with the same primer emulsion composition containing no ultraviolet light screener. Therefore, including an inappropriate ultraviolet light absorbing compound in the primer emulsion composition is generally worse, as far as the durability of adhesion of the organopolysiloxane is concerned, than including no ultraviolet light absorber in said primer emulsion composition.

The foregoing disclosure of this invention is not to be considered as limiting, since many variations may be made by those skilled in the art without departing from the scope or spirit of the foregoing description.

What we claim as new and desire to secure by Letters Patent of the United States is:

1. A method for producing a polycarbonate article having improved mar, abrasion, scratch and chemical solvent resistance and possessing enhanced ultraviolet light stability comprising:
   (i) applying onto a polycarbonate substrate a primer emulsion composition consisting essentially of (a) a thermosettable acrylic polymer, (b) at least one ultraviolet light screening compound selected from the class consisting of benzylidene malonates and cyanoacrylates, (c) from about 20 to about 40 weight percent of a hydroxy ether or an alkanol containing from 1 to 4 carbon atoms, and (d) water;
   (ii) evaporating off a substantial portion of said hydroxy ether or alkanol from said primer emulsion composition thereby forming a layer comprised of said thermosettable acrylic polymer and at least one of said ultraviolet light screening compounds;
   (iii) applying heat to said layer at a temperature and for a period of time effective to cure said thermosettable acrylic polymer;
   (iv) applying onto said cured primer layer a further-curable organopolysiloxane top coat composition containing the partial hydrolysis and condensation product of an alkyltrialkoxy silane;
   (v) evaporating off a substantial portion of the volatile solvents from said top coat composition thereby forming a layer comprised of the partial hydrolysis and condensation product of said alkyltrialkoxy silane; and,
   (vi) thermally curing said partial hydrolysis and condensation product of said alkyltrialkoxy silane.

2. The method of claim 1 wherein said hydroxy ether is represented by the general formula

wherein $R^1$ is an alkyl or an alkoxy alkyl radical containing from 1 to about 6 carbon atoms, and $R_2$ is an alkylidene radical containing from 1 to about 6 carbon atoms, provided that the sum of the carbon atoms present in $R^1$ and $R^2$ is from 3 to about 10.

3. The method of claim 2 wherein said hydroxy ether is butoxy ethanol.

4. The method of claim 1 wherein said cured primer layer has a thickness of from about 0.01 to about 0.1 mil.

5. The method of claim 1 wherein said benzylidene malonates are represented by the general formula

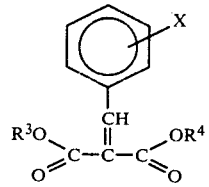

wherein X is selected from hydrogen, OH, halogen radicals, alkyl radicals, and alkoxy radicals; and $R^3$ and $R^4$ are independently selected from alkyl radicals, substituted alkyl radicals, aryl radicals, substituted aryl radicals, alkaryl radicals, and aralkyl radicals.

6. The method of claim 5 wherein X is an alkoxy radical and $R^3$ and $R^4$ are independently selected from alkyl radicals.

7. The method of claim 6 wherein X is a methoxy radical.

8. The method of claim 7 wherein said methoxy radical is in the para position.

9. The method of claim 8 wherein $R^3$ and $R^4$ are both ethyl radicals.

10. The method of claim 8 wherein $R^3$ and $R^4$ are both methyl radicals.

11. The method of claim 1 wherein said cyanoacrylates are represented by the general formula

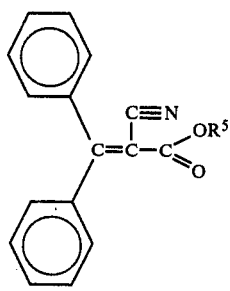

wherein $R^5$ is selected from alkyl radicals, substituted alkyl radicals, aryl radicals, substituted aryl radicals, alkaryl radicals and aralkyl radicals.

12. The method of claim 11 wherein $R^5$ is an alkyl radical.

13. The method of claim 12 wherein said alkyl radical is octyl.

14. The method of claim 12 wherein said alkyl radical is ethyl.

15. A method for providing a uniform and durably adhered mar, scratch, abrasion and chemical solvent resistant organopolysiloxane coating on a polycarbonate article which comprises:
(i) applying onto the surface of a polycarbonate substrate a primer emulsion composition consisting essentially of, in percent by weight, (a) from about 1 to about 10 percent of a thermosettable acrylic polymer, (b) from about 1 to about 10 percent of at least one ultraviolet light screening compound selected from the class consisting of benzylidene malonates and cyanoacrylates, (c) from about 20 to about 40 percent of a hydroxy ether or an alkanol containing from 1 to 4 carbon atoms, and (d) from about 40 to about 78 percent water;
(ii) evaporating off a substantial portion of said hydroxy ether or alkanol from said primer emulsion composition thereby forming a layer comprised of said thermosettable acrylic polymer and at least one of said ultraviolet light screening compounds;
(iii) applying heat to said layer at a temperature and for a period of time effective to cure said thermosettable acrylic polymer;
(iv) applying onto said cured primer layer a further-curable organopolysiloxane top coat composition comprised of the partial hydrolysis and condensation product of an alkyltrialkoxy silane;
(v) evaporating off a substantial portion of the volatile solvents from said top coat composition thereby forming a layer comprised of the partial hydrolysis and condensation product of said alkyltrialkoxy silane; and,
(vi) thermally curing said partial hydrolysis and condensation product of said alkyltrialkoxy silane.

16. The method of claim 15 wherein said hydroxy ether is represented by the general formula $$R^1-O-R^2-OH$$

wherein $R^1$ is an alkyl or an alkoxy alkyl radical containing from 1 to about 6 carbon atoms, and $R^2$ is an alkylidene radical containing from 1 to about 6 carbon atoms, provided that the sum of the carbon atoms present in $R^1$ and $R^2$ is from 3 to about 10.

17. The method of claim 16 wherein said hydroxy ether is butoxy ethanol.

18. The method of claim 15 wherein said cured primer layer has a thickness of from about 0.01 to about 0.1 mil.

19. The method of claim 15 wherein said benzylidene malonates are represented by the general formula

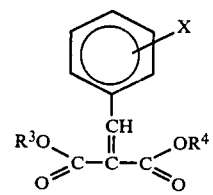

wherein X is selected from hydrogen, OH, halogen radicals, alkyl radicals, and alkoxy radicals, and $R^3$ and $R^4$ are independently selected from alkyl radicals, substituted alkyl radicals, aryl radicals, substituted aryl radicals, alkaryl radicals, and aralkyl radicals.

20. The method of claim 19 wherein X is an alkoxy radical and $R^3$ and $R^4$ are independently selected from alkyl radicals.

21. The method of claim 20 wherein X is a methoxy radical.

22. The method of claim 21 wherein said methoxy radical is in the para position.

23. The method of claim 22 wherein $R^3$ and $R^4$ are both ethyl radicals.

24. The method of claim 22 wherein $R^3$ and $R^4$ are both methyl radicals.

25. The method of claim 15 wherein said cyanoacrylates are represented by the general formula

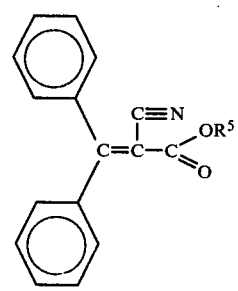

wherein $R^5$ is selected from alkyl radicals, substituted alkyl radicals, aryl radicals, substituted aryl radicals, alkaryl radicals and aralkyl radicals.

26. The method of claim 25 wherein $R^5$ is an alkyl radical.

27. The method of claim 26 wherein said alkyl radical is octyl.

28. The method of claim 26 wherein said alkyl radical is ethyl.

* * * * *